United States Patent [19]

Feldman et al.

[11] Patent Number: 5,216,600
[45] Date of Patent: Jun. 1, 1993

[54] METHOD FOR ELIMINATING PARASITIC NOISE IN AN X-RAY SCANNER

[75] Inventors: Andréi Feldman, Paris; Dominique Cornuejols, Palaiseau, both of France

[73] Assignee: General Electric CGR SA, Issy Les Moulineaux, France

[21] Appl. No.: 426,190

[22] Filed: Oct. 25, 1989

[30] Foreign Application Priority Data

Oct. 28, 1988 [FR] France ................... 8814165

[51] Int. Cl.⁵ ............................................. G06F 15/42
[52] U.S. Cl. ............................ 364/413.15; 364/413.13
[58] Field of Search ............................... 378/901; 364/413.13–413.23

[56] References Cited

U.S. PATENT DOCUMENTS 4,654,796   3/1987   Takagi et al. ................ 364/413.15

FOREIGN PATENT DOCUMENTS 2368760   5/1978   France .

OTHER PUBLICATIONS

Gonzalez et al., *Digital Image Processing*, 2nd Edition, 1987, Addison-Wesley Pub. Co., pp. 163–175.
IEEE Transactions on Nuclear Science, vol. NS-25, No. 5, Oct. 1978, pp. 1111–1116, IEEE, New York, U.S., C. Kowalski, "Suppression of Ring Artefacts in CT Fan-Beam Scanners".

*Primary Examiner*—Roy N. Envall, Jr.
*Assistant Examiner*—David Huntley
*Attorney, Agent, or Firm*—Nilles & Nilles

[57] ABSTRACT

A method for elimination of parasitic noise in an x-ray scanner consists of computing the mean value of the signals of the ten first views in a circuit (26). This mean value is subtracted from the signals of the first view $V_1$ in a circuit (27) so as to obtain the high-frequency components $H_1$ which are considered as parasitic noise. The signals $H_1$ are filtered in a high-pass filter before being subtracted from the signals of the view $V_1$ to obtain signals $V'_1$ which are free of parasitic components. The signals $V'_1$ are processed in a sequential circuit (31) in order to obtain signals $V'_2$ which are free of parasitic component. The same process is repeated for the signals of the other views $V_3$ to $V_m$.

1 Claim, 2 Drawing Sheets

METHOD FOR ELIMINATING PARASITIC NOISE IN AN X-RAY SCANNER

BACKGROUND OF THE INVENTION

1. Field of the Invention

This invention relates to x-ray scanners and more particularly to a method for eliminating parasitic noise of microphonic origin in a scanner of this type. The invention is also concerned with a system for carrying out said method.

2. Description of the Prior Art

In order to examine a patient, x-ray devices known as scanners are coming into increasingly frequent use for producing images of cross-sections of the patient's body. These devices are based on the physical phenomenon of absorption of x-rays by the human body. This absorption is directly related to the distance x of travel of the x-rays within the body in accordance with the formula:

$$I = I_o e^{-bx}$$

where:
- $I_o$ is the intensity of radiation which passes into the human body,
- $I$ is the intensity of radiation which passes out of the human body,
- $b$ is a coefficient of attenuation which depends on the body through which the radiation passes.

In a logarithmic measurement scale, the attenuation $I/I_o$ is equal to $bx$ or in other words proportional to the distance x.

As shown in FIG. 1 of the accompanying drawings, a scanner is essentially constituted by an x-ray source 10 associated with a detection device 11, these two elements being disposed in a fixed geometrical relationship to each other in order that the body to be examined may be positioned between them. Furthermore, they are supported by a structure (not shown) which is capable of rotating about the body to be examined so as to irradiate the body at different angles. The x-ray source which is controlled by a device 13 emits x-rays in an angular sector which has a sufficient width to illuminate the entire cross-section of the body. The detection device 11 has the shape of an annular sector, the length of which is adapted to the width of the x-ray beam and is constituted by a large number of elementary detectors 12 in juxtaposed relation.

In order to obtain an image of the cross-section of the human body through which the x-ray beam passes, the structure which supports the source 10 and the detection device 11 is caused to rotate around the body and the output signals of the elementary detectors 12 are measured, then suitably processed in accordance with known methods in order to obtain a representative image of the cross-section. For this processing operation, the elementary detectors 12 (also known as channels) are connected to an electronic device 14 which first carries out a computation of the logarithm of the signals received so as to obtain a signal whose amplitude is proportional to the attenuation of the x-rays.

The signal which is delivered by an elementary detector is constituted by a useful signal mixed with noise. The noise arises from a number of causes such as, for example, the detector itself, vibrations of the scanner, and so on. This results in deterioration of the signal-to-noise ratio and in the appearance of artifacts or defects on the image produced by the electronic device 14 (FIG. 1) when these different noises are not sufficiently reduced by better mechanical construction of the scanner or suitable electronic processing of the useful signal. These mechanical and electronic solutions are difficult to apply in practice and lead to a substantial increase in cost price.

The method in accordance with the invention is based on the observation that, at the time of examination of the patient's body by the scanner, the signals of the channels must not exhibit differences having high-frequency components from one view to the next. If such differences exist, they must be detected in order to permit the possibility of subtracting them from the initial signal and thus to obtain a signal which is free from these high-frequency components.

SUMMARY OF THE INVENTION

The invention relates to a method of elimination of parasitic noise in an x-ray scanner which is capable of taking m views $V_1$ to $V_m$ and comprising an x-ray source and an N-channel detection device, the method being distinguished by the fact that it involves the following operations:

- computation per channel of the mean value $\overline{V}_p$ of the attenuation signals corresponding to the p first consecutive views $V_1$ to $V_p$
- subtraction per channel of said mean value $\overline{V}_p$ from the signal of the view $V_1$ so as to obtain a signal $H_1$ corresponding essentially to the high-frequency components of the signal of the view $V_1$ and to the low-frequency components of the useful signal,
- filtering of said signal $H_1$ so as to eliminate the low-frequency components and to obtain a signal $H'_1$,
- subtraction per channel of said signal $H'_1$ from the signal of the view $V_1$ so as to obtain a signal $V'_1$ which is free of high-frequency components,
- subtraction per channel of said signal $V'_1$ from the signal of the view $V_2$ so as to obtain a signal $H_2$ corresponding to the high-frequency components of the signal of the view $V_2$ and to the low-frequency components of the useful signal,
- subtraction per channel of said signal $H_2$ from the signal of the view $V_2$ so as to obtain a signal $V'_2$ which is free of high-frequency components,
- sequential reiteration of the two last-mentioned operations on the signals of the views $V_3$ to $V_m$ and $V'_2$ to $V'_{m-1}$.

The invention also relates to a system for carrying out the method in an x-ray scanner in which the N'm codes of the m views are recorded in a first memory, said system being distinguished by the fact that it comprises:

- a circuit for computing the mean value $\overline{V}_p$ of the signals on p views $V_1$ to $V_p$
- a subtraction circuit for subtracting the mean value $\overline{V}_p$ from the signal of the view $V_1$ and obtaining the signal $H_1$,
- a filter for eliminating the low-frequency components in the signal $H_1$ and obtaining a signal $H'_1$,
- a second subtraction circuit for subtracting the signal $H'_1$ from the signal of the view $V_1$ and obtaining the signal $V'_1$,
- a sequential circuit for successively processing the signals of the views $V_2$ to $V_m$ so as to subtract therefrom the signals $V'_1$ to $V'_{m-1}$ respectively and then to subtract the result $H_2$ to $H_m$ of this subtraction from the signals of the views $V_2$ to $V_m$, a second memory for recording the signals $V'_1$ to $V'_m$ delivered by the sequential circuit.

DETAILED DESCRIPTION OF THE INVENTION

Figure 1:
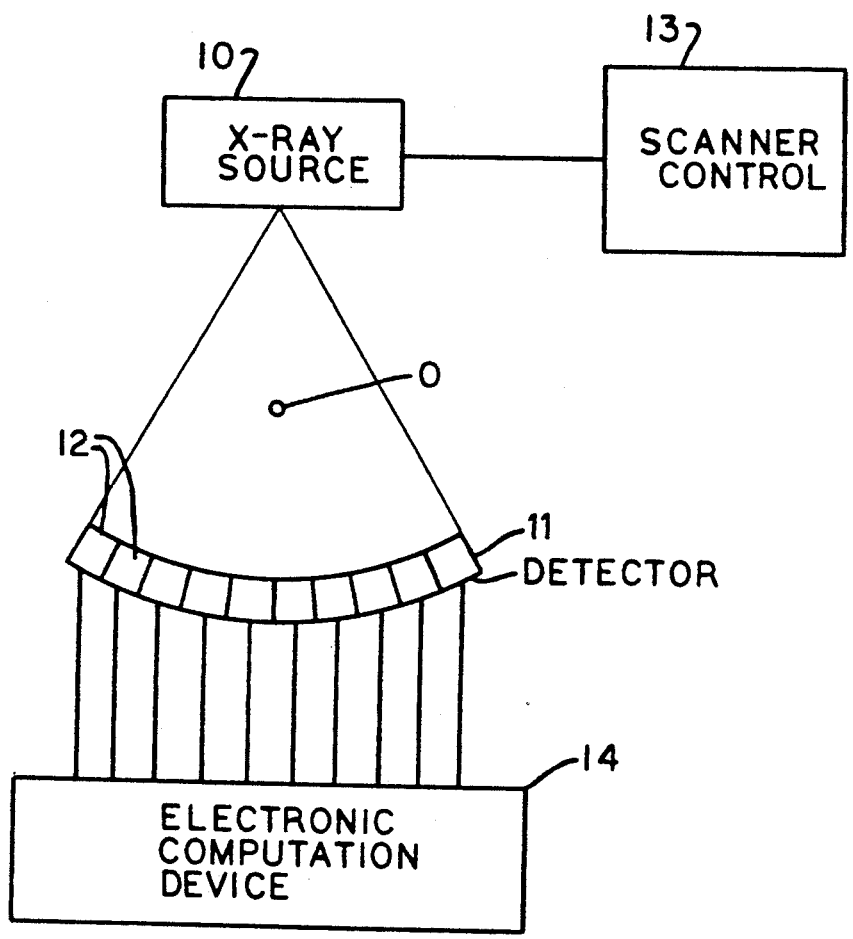
FIG. 1 is a schematic diagram of an x-ray scanner as described in the introductory part of this specification.
Figure 2:
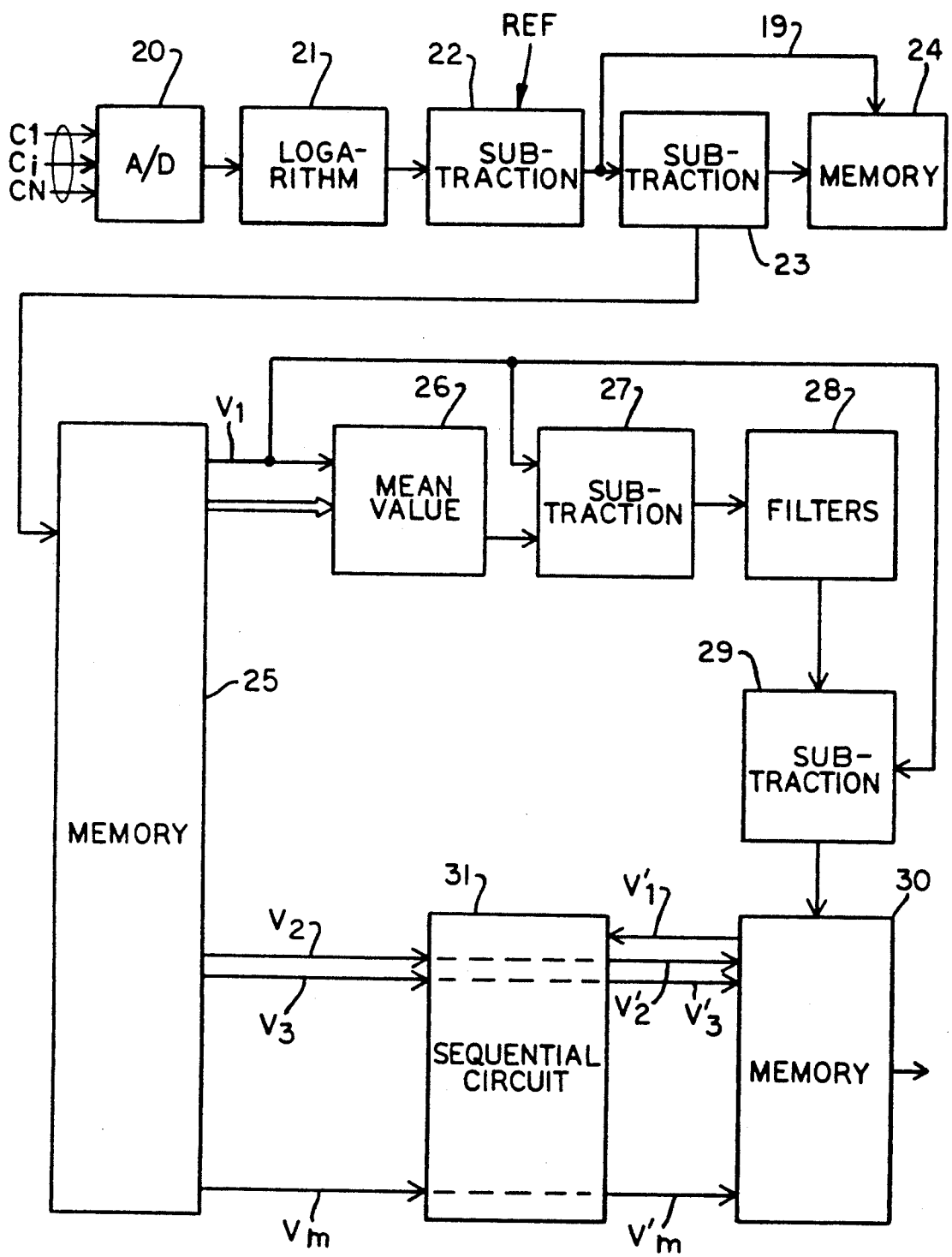
FIG. 2 is a functional diagram of a system for eliminating parasitic noise in an x-ray scanner in accordance with the invention.

In FIG. 2, the signals delivered by the N detectors or channels $C_1 \ldots C_i \ldots C_N$ are applied to an analog/digital coding circuit 20 which delivers digital values or codes. All the operations described hereinafter will be carried out according to these codes. These operations can be performed by means of a suitably programmed computer.

The N codes resulting from a measurement in an elementary position $a_j$ or view are applied to a logarithm computation circuit 21.

The logarithmic values are subtracted in a circuit 22 from a reference logarithmic value REF delivered by a detector known as a monitor which receives the x-radiation directly without attenuation irrespective of the angular position $a_j$. These N differential values each correspond to one channel and provide the values of acquisition in the air in the case of one view. These N values are recorded in the memory 24 at the time of the acquisition operation by means of the direct connection 19. This operation is repeated for each of the m views and the value obtained for each channel is added to the preceding in order to obtain a mean value which replaces in the memory 24 the mean value which results from the preceding views. After m views, the memory 24 contains N mean values, one per channel, which serve as a reference during the other calibration operations and during the operations of measurement on a patient.

During normal operation of the scanner, that is to say when a patient's body is placed in position, a series of m views is taken and the signals corresponding to each view are processed as follows. After processing in the circuits 20, 21 and 22 as explained earlier, the N codes of one view are applied to a second subtraction circuit 23 in which they are subtracted from the N codes of the same view contained in the memory 24. By means of this subtraction, one is freed from the characteristics of the detectors 12 which are different from one detector to another. It will be noted that the first subtraction in the circuit 22 makes it possible to be free in particular from variations in emission of the source 10.

The N codes per view are recorded in a memory 25 which has a capacity of N'm codes in order to record the signals corresponding to a complete revolution of the scanner or to a half-revolution. In a scanner of the prior art, these N'm codes are processed in accordance with known algorithms so as to obtain an image of a cross-section of the patient's body. Before carrying out the so-called image reconstruction processing operation, the N'm codes are processed so as to eliminate high-frequency parasitic noise by carrying out the method in accordance with the invention.

The first operation consists of establishing in a circuit 26 the mean value per channel of the signals in a number of consecutive views such as, for example, the first ten views $V_1$ to $V_{10}$. By means of this operation, the high-frequency parasitic signals are eliminated and the signal-to-noise ratio is improved by the factor $\sqrt{10}$. More generally, the number of views will be equal to p and the mean value will be denoted $\overline{V}_p$.

The second operation, performed in a circuit 27, consists in subtracting said mean value $\overline{V}_p$ from the signal of the first view $V_1$. This second operation is performed for each channel so as to retain a series of N codes. This subtraction eliminates the low-frequency components with the exception of those which correspond to the useful signal and therefore results in the appearance of the high-frequency components $H_1$ which correspond essentially to parasitic signals.

The third operation consists in eliminating the remainder of the low-frequency components in a circuit 28 so as to isolate the high-frequency components in a signal $H'_1$.

The fourth operation consists in subtracting the high-frequency components $H'_1$ from the signal of the first view $V_1$ in a circuit 29 so as to remove the high-frequency components from said first view $V_1$. A signal $V'_1$ is thus obtained and is recorded in a memory 30 which is similar to the memory 25. This signal $V'_1$ contains the useful signal. An image is then generated from this signal and displayed in a manner which is, per se, well known.

It is apparent that the four operations which have just been described are carried out in digital form and that, in consequence, the signal $V'_1$ is recorded in the memory 30 in the form of N codes.

The following operations are carried out by means of a circuit 31 which receives successively on the one hand the N codes of each of the views $V_2$ to $V_m$ obtained from the memory 25 and, on the other hand, the N codes of each of the signals $V'_1$ to $V'_{m-1}$ recorded in the memory 25 and which result from the processing operation performed in the circuit 31, except in regard to the N codes of the view $V'_1$.

The circuit 31 carries out the following operations sequentially:

subtraction of $V'_1$ from $V_2$ so as to cause the appearance of the high-frequency components $H_2$ of the signal $V_2$, subtraction of $H_2$ from $V_2$ so as to eliminate the high-frequency components in the signal $V_2$, recording of the resultant signal $V'_2$ in the memory 30.

The above operations are repeated for the following view $V_3$ from which $V'_2$ is subtracted, and so on in the case of the following views up to the view $V_m$.

To summarize, the different operations of the method are as follows:

computation per channel of the mean value $V_p$ of the signals corresponding to the p first consecutive views $V_1$ to $V_p$, subtraction per channel of said mean value $V_p$ from the signal of the view $V_1$ so as to obtain a signal $H_1$ corresponding essentially to the high-frequency components of the signal $V_1$, filtering of said signal $H_1$ so as to eliminate the low-frequency components and to obtain a signal $H'_1$, subtraction per channel of said signal $H'_1$ from the signal $V_1$ so as to obtain a signal $V'_1$ which is free of high-frequency components, subtraction per channel of said signal $V'_1$ from the signal $V_2$ so as to obtain a signal $H_2$ corresponding to the high-frequency components of the signal $V_2$, subtraction per channel of said signal $H_2$ from the signal $V_2$ so as to obtain a signal $V'_2$ which is free of high-frequency components, sequential reiteration of the two last-mentioned operations on the signals $V_3$ to $V_m$ and $V'_2$ to $V'_{m-1}$ respectively.

The system has been described on the assumption that two memories 25 and 30 are employed but it will be understood that these latter can constitute one and the same memory.

What is claimed is:

1. A method for eliminating parasitic noise in an X-ray scanner wherein said scanner is capable of taking m views $V_1$ to $V_m$ of a body to be scanned and generating signals corresponding to views $V_1$ to $V_m$ and wherein said scanner includes an X-ray source and a detection device having N channels, said method comprising the steps of:

irradiating said body with rays from said X-ray source;

detecting said rays with said N-channel detection device;

computing, for each channel, a mean value $\overline{V}_p$ of the signals corresponding to p first consecutive views $V_1$ to $V_p$;

subtracting, for each channel, said mean value $\overline{V}_p$ from the signal of the view $V_1$ so as to obtain a signal $H_1$ which corresponds essentially to the high-frequency components of the signal of the view $V_1$;

filtering said signal $H_1$ in order to eliminate low frequency components and to obtain a signal $H'_1$;

subtracting, for each channel, said signal $H'_1$ from the signal of the view $V_1$ in order to obtain a signal $V'_1$ which is free of high-frequency components; and generating an image using the signal $V'_1$, and displaying said image.

* * * * *